Patented July 21, 1931

1,815,727

UNITED STATES PATENT OFFICE

MARVIN C. REYNOLDS AND ALBERT K. EPSTEIN, OF CHICAGO, ILLINOIS

FOOD PRODUCT AND PROCESS

No Drawing.  Application filed August 8, 1929. Serial No. 384,464.

Our invention relates to improved food products, and the process of producing the same.

More specifically our invention relates to the manufacture of cultured or ripened milk and the use of said cultured milk for producing an improved margarine.

It has been a common practice heretofore in the manufacture of margarine to pasteurize whole milk or skimmed milk, or partially skimmed milk and to inoculate the pasteurized milk with lactic acid organisms to ripen it. In the ripening process as carried on in this way relatively large clots were formed, and these clots had to be broken up in churning. In some cases, a solution of gelatine or starch was added to the milk after it had been ripened and this mixture was then added to a mixture of oils and fats and churned to produce an emulsion. This emulsion was subsequently crystallized in a body of cold water, or by any other cold medium, the excess water allowed to drain off, then salted, "worked" and made into prints, in which form it is vended to the trade as margarine.

In the methods of preparing the milk for churning, used heretofore, the casein of the milk clotted into relatively large particles, forming large aggregates, and many times there was a tendency to "whey off", due to the fact that the large particles of clotted casein, which had imbibed a certain amount of the moisture of the milk, expelled this moisture.

In using ripened milk for emulsification with oils and fats, the clotted casein particles serve as emulsion nuclei, but in the old process these particles were too large, as they are aggregates of many particles, and for this reason the emulsion produced by the use of such milk products does not possess the best physical condition.

We have discovered that if the casein particles produced during the ripening of the milk are smaller in size, a much smoother ripened milk will be obtained, with a greater number of casein particles; and a better emulsion will result when such finely dispersed ripened casein is used as an emulsifying agent in combination with oils and fats to produce an emulsion in the form of margarine.

In order to accomplish this result, we have discovered that when we add to the milk before ripening a water soluble colloid such as gelatine, gum tragacanth, or any other equivalent gum, such as gum Arabic or gelatinized starch, or any other water soluble protective colloid, the milk may be ripened to the proper degree of acidity, and a product will be obtained which will be heavy in consistency and smooth in texture, having casein particles dispersed in very small aggregates, obviating the tendency to whey off. This modified ripened milk product may be used by itself in the form of a beverage, but it is within the province of our invention to employ it principally as an ingredient of margarine. The margarine produced with this modified ripened milk as an ingredient has a much smoother texture and a more velvet-like consistency.

In practice, one of the ways in which we carry out this invention is as follows:

Eighty gallons of skim milk are placed in a large container and from two to two and one-half pounds of a good grade of edible gelatine are dissolved therein. The milk is then pasteurized at a temperature of approximately 140 degrees Fahrenheit for about thirty-five minutes and when thoroughly pasteurized the temperature thereof is reduced to approximately 70 degrees Fahrenheit. The pasteurized milk is then inoculated with a good strong culture of lactic acid organism or other equivalent acid producing organism used for ripening milk. In the process as usually carried on about 1% by weight of the culture is employed and the milk may be allowed to ripen over night or until the titratable acidity with phenolphthalein as an indicator will show about .7% to .8% lactic acid. The margarine emulsion is then made in the usual manner employing any suitable mixture of fats and oils, the amount used generally being in the neighborhood of about 1600 pounds with 80 gallons of the cultured milk.

The principal fact to bear in mind in carrying out our process is that the colloid must be introduced into the milk before it is ripened or soured in order to produce the small curd condition which we find so valuable. We have made it a practice to introduce the colloid before the pasteurizating step has been applied to the milk, but it may be introduced at any time before the ripening of the milk has been completed providing adequate dispersion results.

The most important feature of our invention is the use of a milk with small curds as a constituent of margarine to obtain an improved product. The most satisfactory manner of controlling the ripening to prevent aggregation and secure a very small curd is by the use of a protective colloid as described. We have referred to many detailed steps and features of our improved process for the instruction of those skilled in the art, but the invention is limited only by the scope of the appended claims.

What we claim as new and desire to protect by United States Letters Patent is:

1. The process of producing margarine which comprises introducing a protective colloid material into sweet milk, pasteurizing the milk, inoculating the pasteurized milk with an acid producing organism to ripen it, and emulsifying the ripened milk with suitable fats and oils.

2. The method of producing an improved margarine which comprises adding a protective colloid material to fresh unripened milk, ripening the milk to produce unusually small curds due to the presence of the protective colloid, and finally churning the small curd milk with oleaginous material to produce a margarine emulsion.

3. The method of producing an improved margarine which comprises adding a protective colloid to fresh unripened milk, inoculating the milk with a lactic acid producing organism whereby the action of the organism on the milk in the presence of the protective colloid produces a ripened milk with very small curds, and finally churning said ripened milk with oleaginous material to produce a margarine emulsion.

4. The method of producing an improved margarine which comprises adding gelatine to fresh unripened milk, inoculating the milk with a lactic acid producing organism whereby the action of the organism on the milk in the presence of the gelatine produces a ripened milk with very small curds, and finally churning said ripened milk with oleaginous material to produce a margarine emulsion.

5. The method of producing an improved margarine which comprises adding gelatine to fresh skimmed milk in proportions of about eighty gallons of milk to two and one-half pounds of gelatine, pasteurizing the milk and gelatine mixture until acid producing organisms are destroyed, inoculating the pasteurized milk and gelatine mixture with a strong culture of lactic acid organisms, and allowing the same to stand until the acidity with a phenolphthalein indicator will show about .7% to .8% lactic acid, and churning the resulting soured mixture with a mixture of fats and oils to the total of about sixteen hundred pounds to produce a margarine emulsion.

6. The process of producing margarine which comprises pasteurizing sweet milk, cooling it to room temperature, inoculating the milk with suitable acid producing organisms to ripen it, introducing a protective colloid material into the milk at a suitable time before the ripening has progressed, ripening it to the desired degree of acidity and emulsifying the resultant ripened milk with oils and fats to produce a margarine emulsion, and stabilizing the emulsion by cooling and working it to a plastic consistency in the usual manner.

In witness whereof, we hereunto subscribe our names this 5th day of July, 1929.

MARVIN C. REYNOLDS.
ALBERT K. EPSTEIN.